United States Patent
Iwabuchi et al.

(10) Patent No.: US 6,929,204 B2
(45) Date of Patent: Aug. 16, 2005

(54) METHOD OF MANUFACTURING A SPINNING REEL ROTOR

(75) Inventors: Masakazu Iwabuchi, Tondabayashi (JP); Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/771,286

(22) Filed: Feb. 5, 2004

(65) Prior Publication Data

US 2004/0155134 A1 Aug. 12, 2004

Related U.S. Application Data

(62) Division of application No. 10/322,619, filed on Dec. 19, 2002, now abandoned.

(30) Foreign Application Priority Data

Feb. 4, 2002 (JP) ........................................ 2002-026847

(51) Int. Cl.[7] .............................................. A01K 89/02
(52) U.S. Cl. ...................................... 242/231; 242/232
(58) Field of Search ................................ 242/231, 232, 242/233, 311; D22/141

(56) References Cited

U.S. PATENT DOCUMENTS

| | | | | |
|---|---|---|---|---|
| 4,941,626 A | * | 7/1990 | Carlsson | 242/231 |
| 5,193,762 A | * | 3/1993 | Takeuchi | 242/232 |
| D388,860 S | * | 1/1998 | Iwabuchi | D22/141 |
| D405,154 S | * | 2/1999 | Iwabuchi | D22/141 |
| 6,382,540 B1 | * | 5/2002 | Takikura et al. | 242/231 |

FOREIGN PATENT DOCUMENTS

JP        2001-95435 A       4/2001

* cited by examiner

*Primary Examiner*—Emmanuel Marcelo
(74) *Attorney, Agent, or Firm*—Shinjyu Global IP Counselors, LLP

(57) ABSTRACT

A spinning reel rotor includes a cylindrical portion, first and second rotor arms, a bail arm, and a second cover member. The cylindrical portion is mounted rotatably to one end of a reel unit. The first and a second rotor arms extend in a direction away from the reel unit while being curved outward in radial direction from a position in opposition, with respect to the radial direction, to an end of the cylindrical portion on the reel unit side. An aperture is formed in the second rotor arm. The second cover member covers the outside of the second rotor arm and has through holes for adjusting its mass. The through holes expose a portion of the aperture. In this rotor that has a rotor arm provided with an aperture, variations in the rotational balance of cover members due to different degrees of exposure of the aperture are suppressed.

9 Claims, 9 Drawing Sheets

METHOD OF MANUFACTURING A SPINNING REEL ROTOR

This is a divisional application of U.S. patent application Ser. No. 10/322,619 filed on Dec. 19, 2002 now abandoned, which claims priority under 35 U.S.C. 119(a) based on Japanese Patent Application 2002-026847 filed on Feb. 4, 2002.

BACKGROUND OF THE INVENTION

1. Field of the Invention

This invention generally relates to rotors. More specifically, the present invention relates to spinning reel rotors that are rotatably attached to a reel unit of a spinning reel, and which wind fishing line around a spool.

2. Background Information

Spinning reels usually include a reel unit, a rotor and a spool. The reel unit is mounted to a fishing rod. The rotor is mounted rotatably to the reel unit and is for guiding the fishing line that is wound on the spool. The rotor includes a rotor unit and a bail arm that is pivotably attached to the rotor unit. The rotor unit has a cylindrical portion (example of a support portion) rotatably mounted to the reel unit, and first and second rotor arms mounted in opposition to one another and extending outward in radial direction from the rear of the cylindrical portion. The two rotor arms have first and second connection portions that are disposed in opposition at the rear end of the cylindrical portion and first and second arm portions curving from those connection portions and extending frontward at a certain spacing to the cylindrical portion. The cylindrical portion has at the rear end a ring-shaped large diameter portion, whose diameter is larger than the other portions, and the pair of connection portions that extends outward in radial direction from opposing positions on the outer peripheral surface of the large diameter portion.

The bail arm guides the fishing line to the spool, and includes a first bail support member mounted pivotably to the tip of the first arm portion, a second bail support member mounted pivotably to the tip of the second arm portion, a line roller mounted rotatably to the tip of the first bail support member, and a bail made of a piece of wire linking the line roller and the second bail support member.

Among this kind of rotor, rotors that are known, have the first and the second connection portions that are made long in the rotation direction, with at least one of the first and second arm portions being provided with an aperture. By making the two connection portions long in the rotation direction, a high stiffness can be maintained for the two rotor arms in the rotation direction. Furthermore, by providing the arm portion with an aperture, the rotor can be made lighter and provided with an unconventional design. In spinning reels equipped with a rotor having such an aperture portion, the arm portion with the aperture is conventionally covered from the outside in radial direction with a cover member.

When the arm portion with the aperture is covered with a cover member as described above, it would seem to be possible to devise different types of reels having different degrees of exposure of the aperture afforded by the cover member. For example, some cover members might cover the entire aperture, while other cover members might expose at least a portion of the aperture or expose the entire aperture.

However, varying the degree of exposure of the aperture in this manner leads to discrepancies in the mass of the cover member depending on the degree of exposure. Accordingly, there is the risk that the rotational balance of the rotor may be balanced with one cover member, but unbalanced with another cover member.

In view of the above, there exists a need for a spinning reel rotor which overcomes the above mentioned problems in the prior art. This invention addresses this need in the prior art as well as other needs, which will become apparent to those skilled in the art from this disclosure.

SUMMARY OF THE INVENTION

It is a purpose of the present invention to devise a spinning reel rotor having a rotor arm provided with an aperture, in which variations of the rotational balance of cover members with a differing degree of aperture exposure can be suppressed.

According to the first aspect of the invention, a spinning reel rotor that is rotatably mounted to a reel unit of a spinning reel, with which fishing line is wound onto a spool, includes a support portion, first and second rotor arms, a bail arm, and a cover member. The support portion is mounted rotatably to one end of the reel unit. The first and a second rotor arms extend in a direction away from the reel unit while being curved outward in radial direction from a position in opposition, with respect to the radial direction, to an end of the support portion on the reel unit side. An aperture is formed in at least one of the first and the second rotor arm. The cover member covers the outside of one of the first and second rotor arms that has the aperture. The cover member has a mass adjustment portion for adjusting its mass so as to be within a predetermined range. The mass adjustment portion exposes at least a portion of the aperture or closes the aperture.

With this rotor, if cover members with a different exposure degree of the aperture are mounted to the outside of the rotor arm having the aperture, then the mass of the cover members can be adjusted beforehand to a predetermined range with the mass adjustment portion. For example, taking a cover member that closes the entire aperture or a cover member exposing the entire aperture as a reference, the mass of a cover member in which at least a portion of the aperture is exposed can be adjusted with the mass adjustment portion such that its mass falls within a predetermined range. Thus, it is possible to suppress variations of the rotational balance of cover members with different degrees of exposure of the aperture.

According to the second aspect of the invention, in a spinning reel rotor as set forth in the first aspect, the bail arm includes first and second bail support members pivotably mounted to respective ends of the first and second rotor arms, a fixed shaft provided at the first bail support member, a line roller rotatably mounted to the fixed shaft, a fixed shaft cover provided at the front end of the fixed shaft, and a bail linking the second bail support member and the fixed shaft cover. The aperture is formed in the second rotor arm. In this case, the first rotor arm, to which the first bail support member is mounted with the line roller mounted thereto, is provided with the aperture, so that a mechanism such as a bail tripping device can be easily accommodated on the first rotor arm side.

According to the third aspect of the invention, in a spinning reel rotor as set forth in first or second aspect, the mass adjustment portion includes one or a plurality of through holes perforating the cover member. In this case, a variety of designs can be realized with the through holes, while at the same time changing the exposure degree of the aperture.

According to the fourth aspect of the invention, in a spinning reel rotor as set forth in the first or second aspect, the mass adjustment portion includes a depression formed in the cover member. In this case, a variety of designs can be realized with the depression, which does not pass all the way through, while at the same time adjusting the mass with a shut aperture.

According to the fifth aspect of the invention, in a spinning reel rotor as set forth in third or fourth aspect, the mass adjustment portion is a chamfer portion formed around the through hole or the depression. In this case, the mass can be adjusted also by the chamfer portion, in addition to the through holes or the depression, so that the adjustment of the mass becomes even easier.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration and Configuration of Reel Unit

Figure 1:
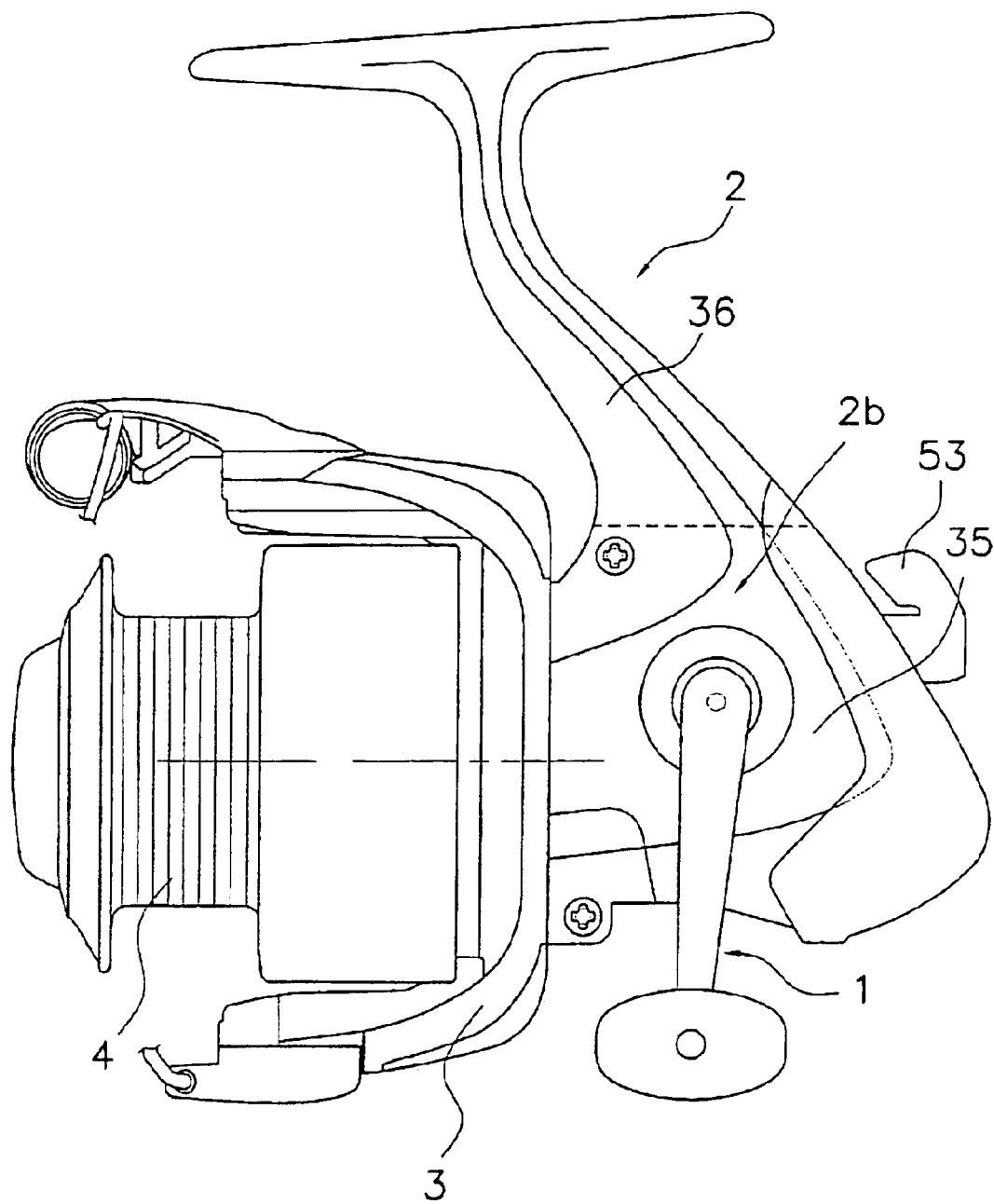
FIG. 1 is a left side view of a spinning reel in accordance with an embodiment of the present invention.
Figure 2:
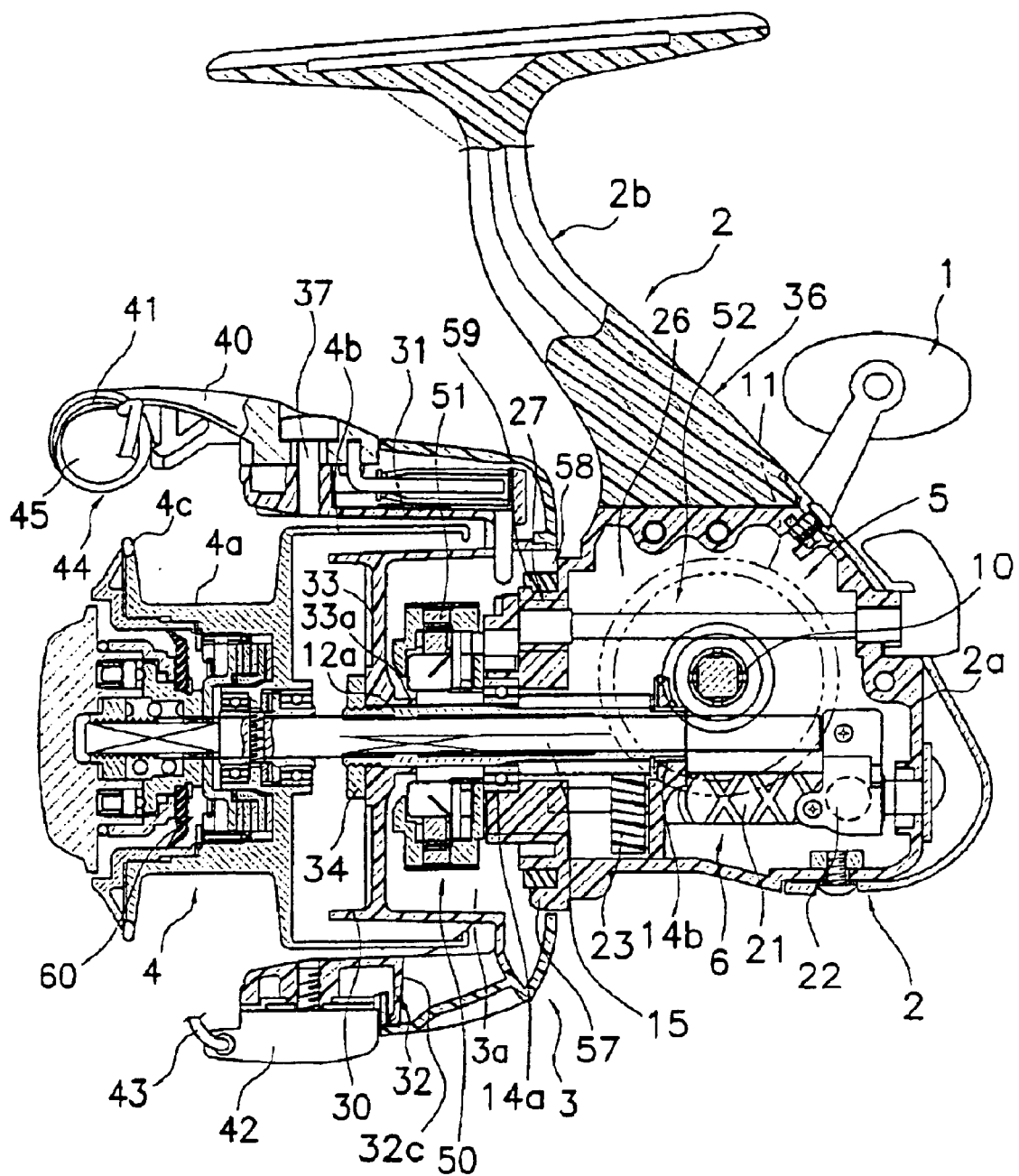
FIG. 2 is a left-side cross-sectional view of the spinning reel shown in FIG. 1

As shown in FIGS. 1 and 2, a spinning reel in accordance with an embodiment of the present invention includes a handle 1, a reel unit 2, a rotor 3, and a spool 4. The reel unit 2 is to be mounted to a fishing rod and rotatably supports the handle 1. The rotor 3 winds fishing line on the spool 4 and is rotatably supported at the front of the reel unit 2. The fishing line is wound around the outer peripheral surface of the spool 4, which is disposed at the front of the rotor 3 and can be shifted back and forth. It should be noted that the handle 1 can be mounted either to the left side of the reel unit 2 as shown in FIG. 1, or to the right side of the reel unit 2 as show in FIG. 2.

The reel unit 2 mainly includes a casing 2a that supports the rotor 3 and the spool 4, and a lid 2b that is screwed detachably to the casing 2a.

The casing 2a is made by injection molding of, for example, a polyamide-based synthetic resin reinforced by glass fibers. The casing 2a has an aperture 25, in which a mechanism accommodating space 26 is provided. The mechanism accommodating space 26 accommodates a rotor driving mechanism 5, an oscillation mechanism 6, and a power transmission mechanism (not shown in the drawings). The rotor driving mechanism 5 rotates thee rotor 3. The oscillating mechanism 6 is for winding up the fishing line homogenously by shifting the spool 4 back and forth. The power transmission mechanism transmits the rotation of the handle 1 to the oscillating mechanism 6. A substantially circular rotation support portion 27 for rotatably supporting the rotor is provided at the front of the casing 2a.

The lid 2b is made, for example, by die casting an aluminum alloy. As shown in FIG. 1, the lid 2b includes a thin-walled cover portion 35 covering the aperture 25 of the casing 2a. Also, an attachment portion 36 is shown extending upward from the cover portion 35.

Configuration of the Rotor

As shown in FIG. 2, the rotor 3 includes a cylindrical portion 30, first and second rotor arms 31 and 32, a bail arm 44, and first and second cover members 46 and 47. The cylindrical portion 30 is mounted rotatably to one end of the reel body 2. The cylindrical portion 30 is provided with an excavation 3a formed in its rear end. The first and second rotor arms 31 and 32 are disposed in opposition to one another at the sides of the cylindrical portion 30. The bail arm 44 is mounted pivotably to the front end of the two rotor arms 31 and 32, and guides spinning line to the spool 4. The first and second cover members 46 and 47 cover the outer side of the two rotor arms 31 and 32. The cylindrical portion 30 and the two rotor arms 31 and 32 are formed in one piece, and are made for example of a synthetic resin.

The cylindrical portion 30 is arranged on the outer peripheral side of the rotation support portion 27 of the casino 2a. A front wall 33 is formed at a front portion of the cylindrical portion 30, and a boss 33a is formed at the center of the front wall 33. A front portion 12a of the pinion gear 12 and the spool shaft 15 are passed through a through hole in the boss 33a. A nut 34 is disposed at the front of the front wall 33, and this nut 34 fastens the rotor 3 to the pinion gear 12 by screwing it to a male threaded portion formed at the front end 12a of the pinion gear 12.

Figure 3:
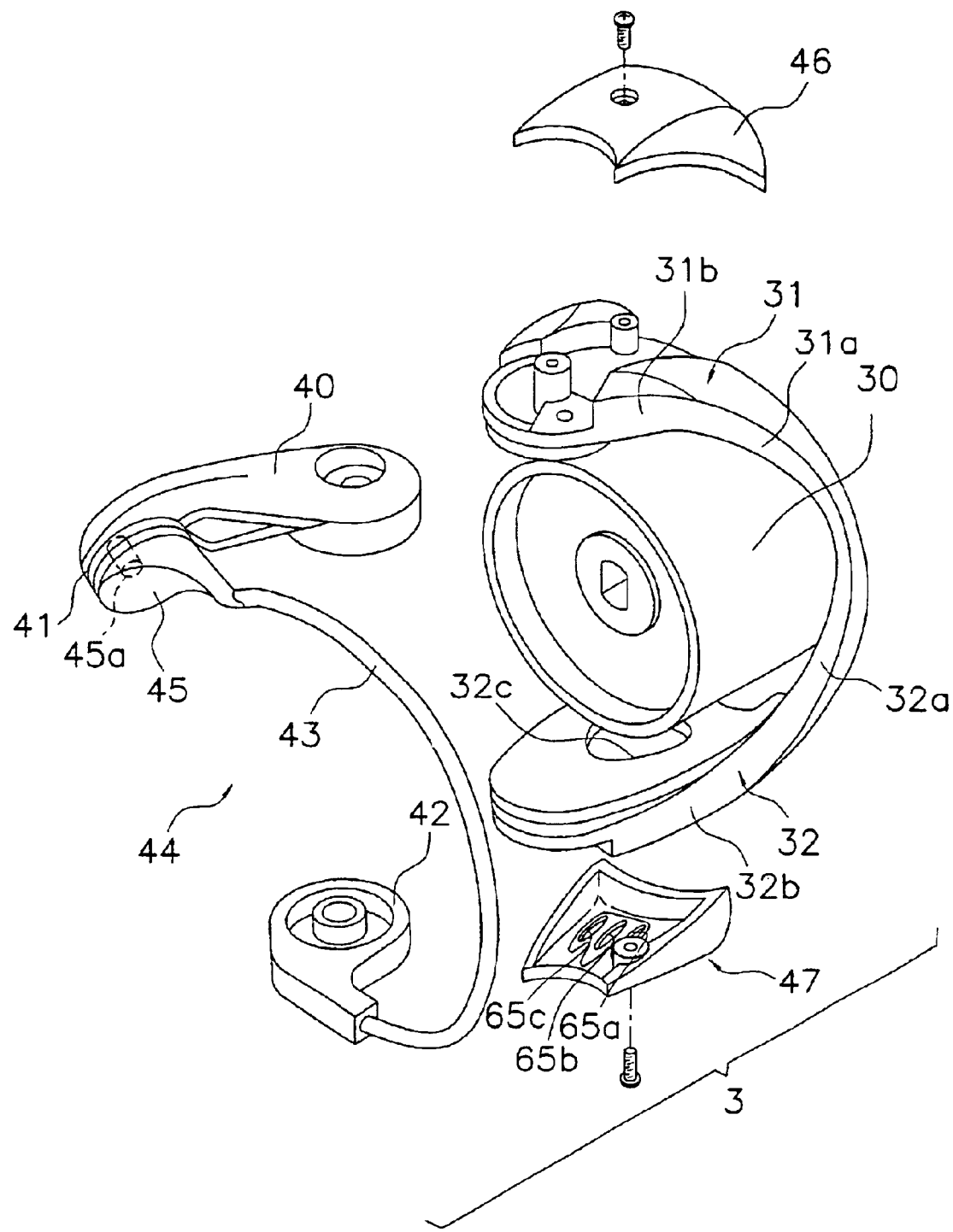
FIG. 3 is an exploded perspective view of the rotor in accordance with an embodiment of the present invention.
Figure 4:
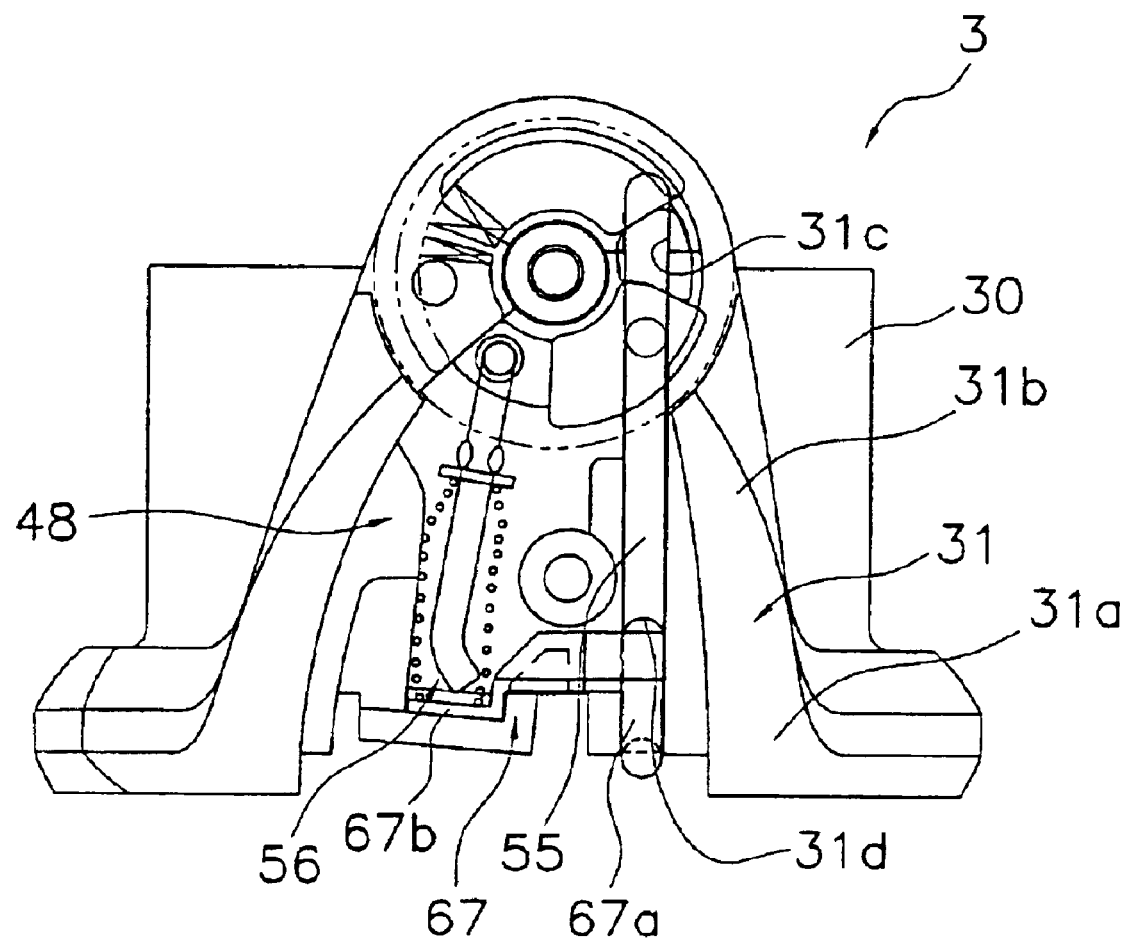
FIG. 4 is an internal view of the first rotor arm in accordance with an embodiment of the present invention.

As shown in FIG. 3 and FIG. 4, the first rotor arm 31 includes a first connection portion 31a arranged at a peripheral surface at the rear of the cylindrical portion 30, and a first arm portion 31b curving out and extending frontward from the first connection portion 31a. The first connection portion 31a widens in circumferential direction at the rear of the cylindrical portion 30 and is formed in smooth circumferential continuation from the cylindrical portion 30. The first arm portion 31b is formed in smooth continuation from the first connection portion 31a and extends frontward at a certain spacing to the cylindrical portion 30. The first arm portion 31b extends frontward such that its tip widens at an angle of approximately 2° with respect to the spool shaft 15. A first bail support member 40 is mounted pivotably to the outer peripheral side at the tip of the first arm portion 31a.

The first bail support member 40 is attached to the first rotor arm 31 with an attachment pin 37 screwed to the first rotor arm 31. The attachment pin 37 is made of a bolt with a hexagonal hole and smooth edges, such that the fishing line does not get caught at its head. A line roller 41 for guiding fishing line to the spool 4, and a fixed shaft cover 45 fixed to the first bail support member 40 are mounted to the front of the first bail support member 40, with the line roller 41 being arranged between the first bail support member 40 and the fixed shaft cover 45. The line roller 41 is mounted rotatably to the tip of the first bail support member 40. The fixed shaft cover 45 is shaped like a deformed cone with a sharpened tip. A fixed shaft 45a for rotatably supporting the line roller 41 is formed in one piece with the fixed shaft cover 45. The front end of the fixed shaft 45a is fixed to the first bail support member 40.

Figure 5:
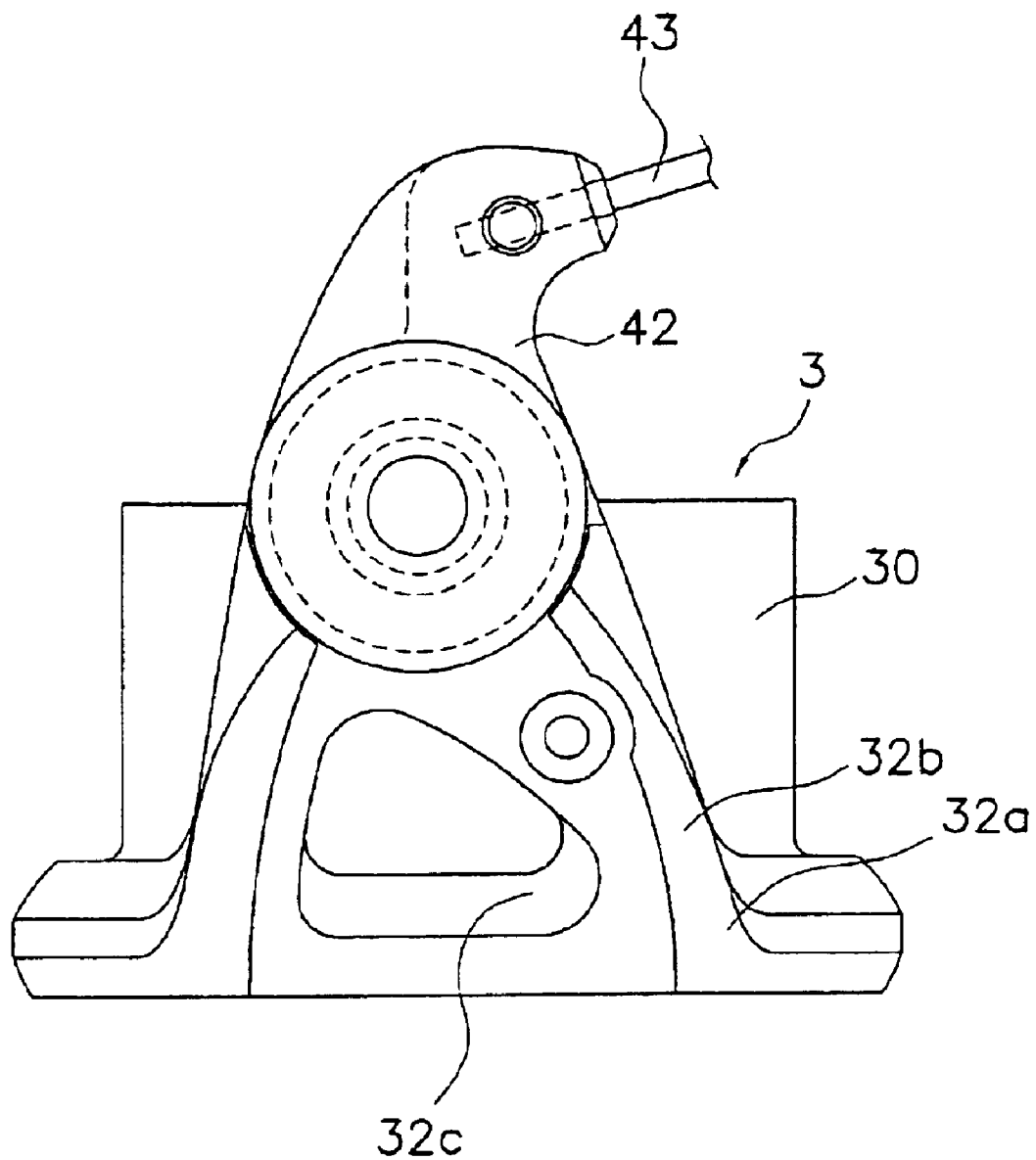
FIG. 5 is a plan view of the second rotor arm in accordance with an embodiment of the present invention.

As shown in FIG. 3 and FIG. 5, the second rotor arm 32 includes a second connection portion 32a arranged at a peripheral surface at the rear of the cylindrical portion 30, and a second arm portion 32b curving out and extending frontward from the second connection portion 32a. The second connection portion 32a is formed in smooth circumferential continuation from the cylindrical portion 30. Also the second arm portion 32b is formed in smooth continuation from the connection portion 32a at a certain spacing to the cylindrical portion 30. The second arm portion 32b extends frontward such that its tip widens at an angle of approximately 2° with respect to the spool shaft 15. At its base, the second arm portion 32b is provided with a substantially triangular aperture 32c. A second bail support member 42 is mounted pivotably to the outer peripheral side at the front of the second arm portion 32b.

A bail 43, made by bending a wire approximately into U-shape as shown in FIG. 3, is fixedly coupled between the tip of the fixed shaft cover 45 and the second bail support member 42. The first and second bail support members 40 and 42, the line roller 41, the bail 43, and the fixed shaft cover 45 constitute a bail arm 44, which guides the fishing line to the spool 4. The bail arm 44 can be pivoted between a line-winding posture shown in FIG. 2 and a line-releasing posture, which can be attained by flipping the bail arm 44 over from the line-winding posture.

The first and the second cover members 46 and 47 are detachably mounted with screws to the outer peripheral side of the first and second rotor arms 31 and 32.

The first cover member 46 entirely covers the radial outer side of the first rotor arm 31. On its inside, a bail tripping mechanism 48 is disposed, which restores the bail arm 44 from the line-releasing posture to its line-winding posture when rotating the rotor 3, and which holds both postures in their respective states.

Figure 6:
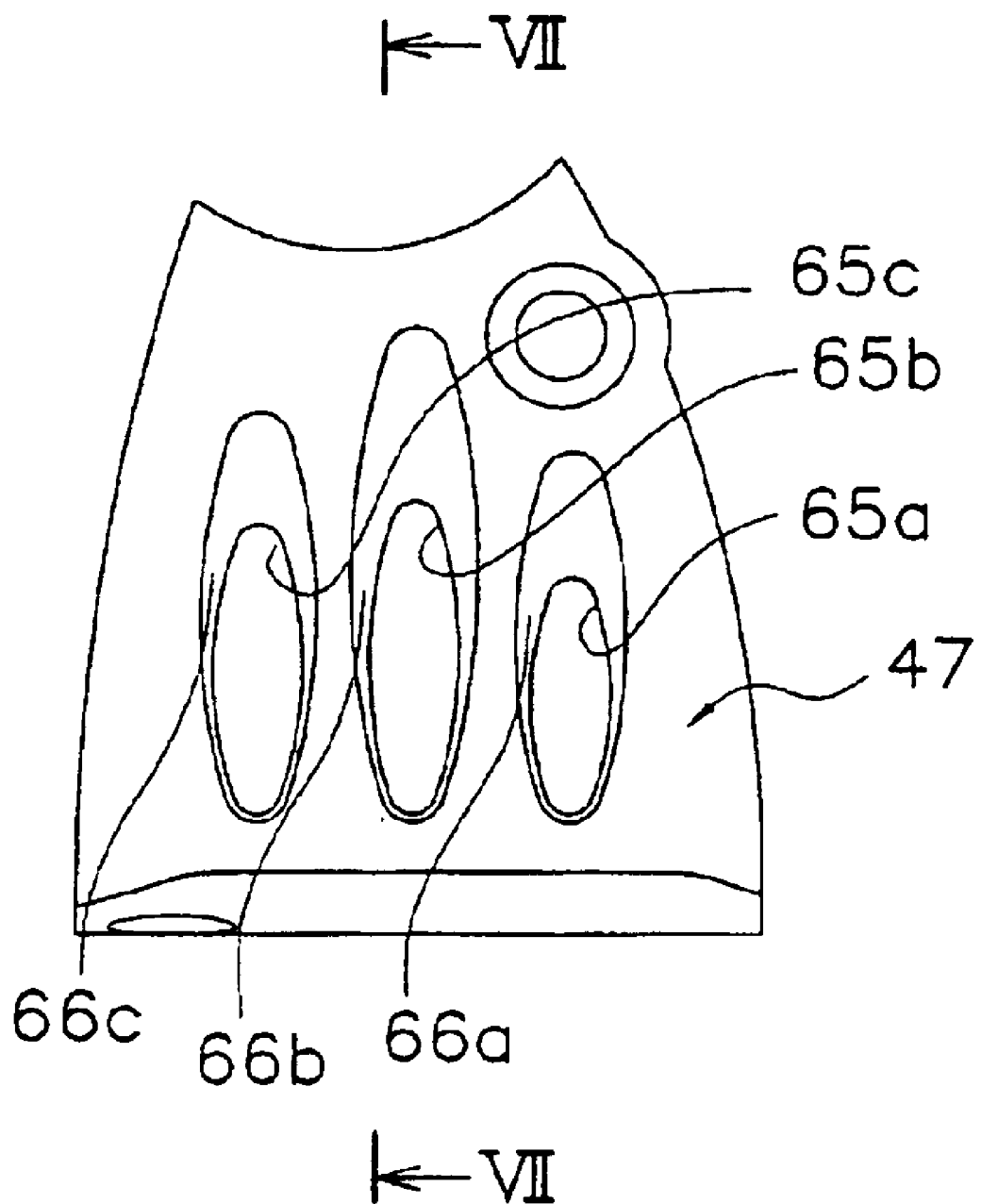
FIG. 6 is a plan view of the second cover member in accordance with an embodiment of the present invention.
Figure 7:
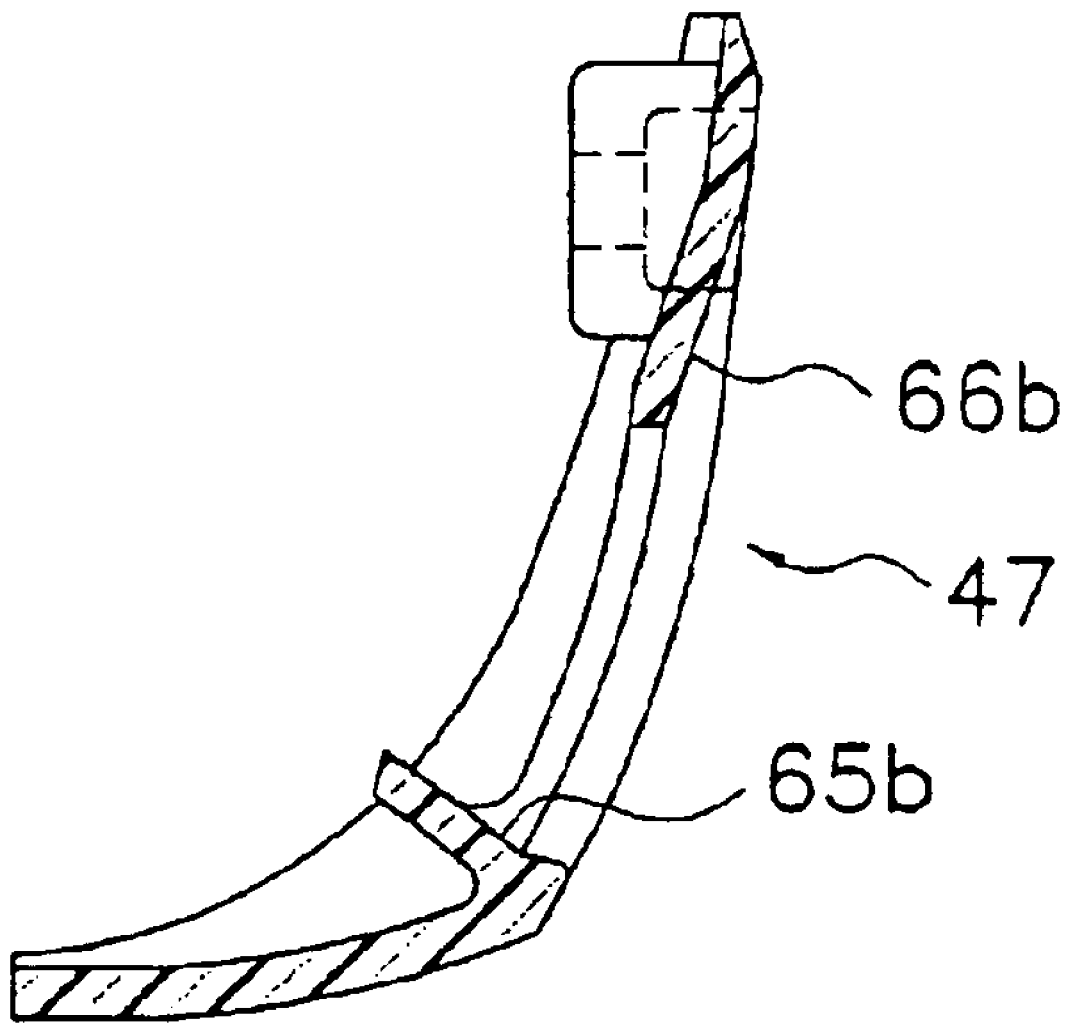
FIG. 7 is a cross-sectional view of the second cover member as viewed along VII—VII in FIG. 6.

The second cover member 47 covers the outer side in radial direction of the second rotor arm 32. As shown in FIG. 6 and FIG. 7, the second cover member 47 is provided with three oval through holes 65a, 65b and 65c, which expose a portion of the aperture 32c of the second arm portion 32b. These through holes 63a, 65b and 65c function as an ornamental mass adjustment portion. The through holes 65a, 65b and 65c are provided solely for ornamental purposes; they are not used to couple the cover member 47 with any other member. The through holes 65a, 65b and 65c are formed at positions that are depressed further inward as compared with the rest of the second cover member 47.

Figure 9:
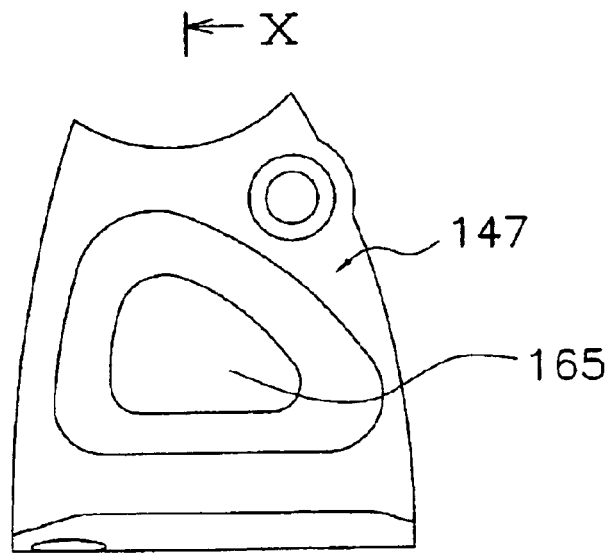
FIG. 9 is a plan view of the second cover member in accordance with another embodiment of the present invention.
Figure 10:
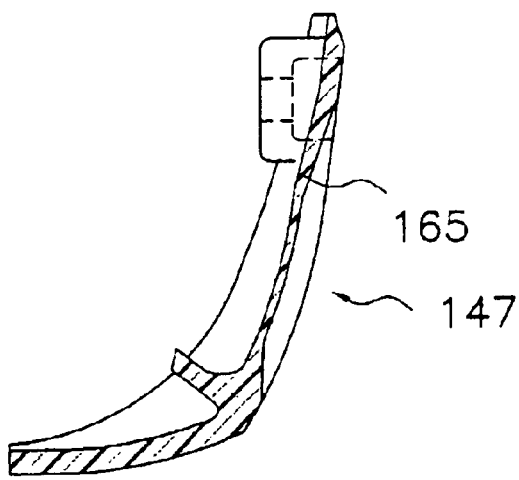
FIG. 10 is a cross-sectional view of the second cover member as viewed along X—X in FIG. 9 in accordance with another embodiment of the present invention.

FIGS. 9 and 10 show a cover member 147 in accordance with another embodiment of the present invention. The cover member 147 has a depression 165, which is the ornamental mass adjustment portion. The depression 165 is formed for solely ornamental purpose. The through holes 65a, 65b and 65c and the depression 165 adjust the mass of the cover members 47 and 147 such that the difference between the weight of the cover member 47 and the weight of the cover member 147 is less than 1 g, more preferably less than 0.5 g.

Referring back to FIG. 3, depression portions 66a, 66b and 66c that are slightly depressed obliquely toward the edge of the through holes 65a, 65b and 65c are formed between the through holes 65a, 65b and 65c and the surface of the second cover member 47. Providing the through holes 65a, 65b and 65c and the depression portions 66a, 66b and 66c, makes it possible to provide a product line of rotor arms of the same shape with different designs, and to provide different models of reels with different designs. Furthermore, since the mass can be adjusted with the through holes 65a, 65b and 65c, it becomes possible to suppress fluctuations of the rotational balance of cover members 47 with different degrees of exposure of the aperture 32c.

In the rotor 3 configured as described above, the rotor arms 31 and 32 are curved outward, so that the bent-over portions have been eliminated. Accordingly, there is no problem of stress concentrations that occur at bent-over portion. Therefore, the stress is evened out, and the strength of the rotor arm can be sustained without having to make its walls thicker. Consequently, the strength can be increased while attaining a rotor 3 with lighter weight. What is more, the cylindrical portion 30, the two connection portions 31a and 32a, and the two arm portions 31b and 32b are formed in smooth continuation with one another, so that the stress at these connection portions is also alleviated, and a higher strength can be sustained. Furthermore, the second rotor arm 32 is provided with an aperture 32c, so that a lighter weight is attained. Moreover, the base portions of the two rotor arms 31 and 32 widen in the circumferential direction, so that also the stiffness of the rotor arms in the circumferential direction is increased, and an even higher strength can be sustained.

As shown in FIG. 4, the bail tripping mechanism 48 includes a shifting member 55, a toggle spring mechanism 56, and a switching member 57 (see FIG. 2). The tip of the shifting member 55 engages the first bail support member 40, and the shifting member 55 can be shifted back and forth inside the first rotor arm 31. The toggle spring mechanism 56 toggles the bail arm 44 between the line-releasing posture and the line-winding posture, and holds the bail arm 44 in the respective postures. The switching member 57 is provided at the front of the rotation support portion 27.

The toggle spring mechanism 56 includes a guide shaft 56a and a coil spring 56b. The tip of the guide shaft 56a is interlocked with the first bail support member 40. The coil spring 56b is disposed around the guide shaft 56a and tapers off at its front end. The toggle spring mechanism 56 toggles the bail arm 44 between the line-releasing posture and the line-winding posture and holds it in the respective postures, with the dead point serving as the dividing line. The dead point of the toggle spring mechanism 56 is set to a position closer to the line-releasing posture.

Figure 8:
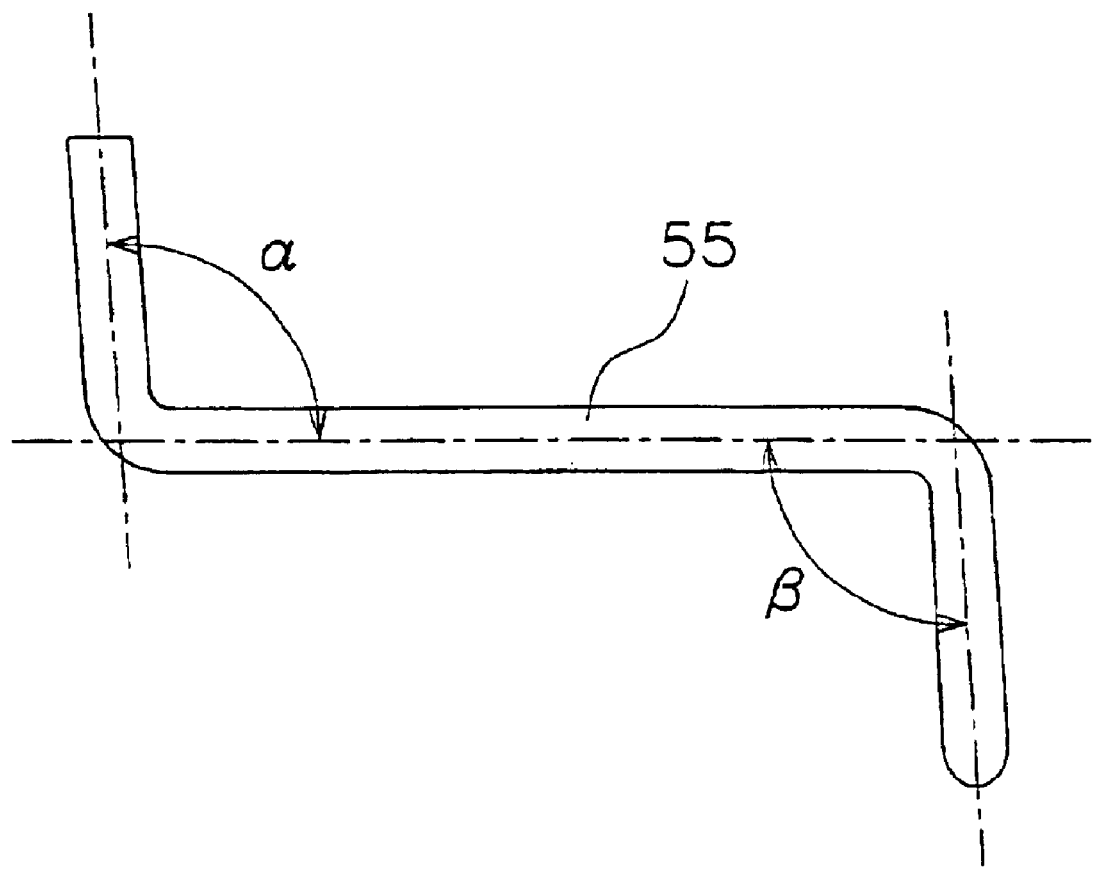
FIG. 8 is a side view of the shifting member in accordance with an embodiment of the present invention.

The shifting member 55 is made of a wire and its two ends are bent over pointing into different directions. The shifting member 55 is guided by a guide groove 31c formed in the first arm portion 31b, and can be shifted back and forth with respect to the reel unit 2. The end of the guide groove 31c near the reel unit 2 is provided with a cutout portion 31d whose front end is semi-circular. Thus, by making the front end of the cutout portion 31c semicircular, stress concentrations can be averted, so that damages due to cracks originating therefrom become less likely. As shown in FIG. 8, the bending angles $\alpha$ and $\beta$ on both sides of the shift member 55 are for example about 92°, that is, slightly larger than 90°. Being bent at angles that are slightly larger than 90°, the shifting member 55 can be guided along the first rotor arm 31 even when the first rotor arm 31 spreads to the front at about 2° with respect to the spool shaft 15.

As shown in FIG. 4, the shifting member 55 is pressed from the radial outer side by a presser member 67 at the base side of the first rotor arm 31. That way, the shifting member 55 is prevented from being lifted up. The presser member 67 is a molded member made of synthetic resin, and includes a presser portion 67a pressing against the shifting member 55 and a spring holding portion 67b holding the base of the coil spring 56b. The presser member 67 is arranged to be in contact with the inner face of the first cover member 46, and prevents the shifting member 55 from being lifted up with the presser portion 67a. The spring holding portion 67a holds the base of the coil spring 56b of the toggle spring mechanism 56 over a distance corresponding to one winding of the coil. Thus, even when the toggle spring mechanism 56 pivots, the coil spring 56b is kept from contacting the guide shaft 56a and faulty operation becomes less likely.

The switching member 57 is constituted by an oblique surface that protrudes frontward at the front of the rotation support portion 27 and that is formed obliquely in the circumferential direction. When the handle 1 is turned in the line-winding direction, the base portion of the shifting member 55 that had been retreated by pivoting into the line-releasing posture contacts the switching member 57, returning the bail arm 44 to the line-winding posture.

Furthermore, the rotor 3 is provided with a rotor braking mechanism 58 that brakes the rotor 3 using the bail tripping mechanism 48. The rotor braking mechanism 58 includes the above-described shifting member 55 and a braking member 59 made of rubber, which contacts the base end surface of the shifting member 55 when in the line-releasing posture. When the bail arm 44 is pivoted into the line-releasing posture, the shifting member 55 retreats and contacts the braking member 59, and thus the rotor braking mechanism 58 brakes the rotor 3. The braking member 59 is mounted to an annular groove provided at the rotation support portion 27.

A reverse rotation check mechanism 50 checking reverse rotation of the rotor 3 is disposed inside the excavation 3a. The reverse rotation check mechanism 50 has a roller-type one-way clutch 51 and an operation mechanism 52 for switching the one-way clutch 51 between an operative state and a non-operative state. An outer ring of the one-way clutch 51 is fixed to the casing 2a, and an inner ring of the one-way clutch 51 is fixed non-rotatably to the pinion gear 12. The operation mechanism 52 includes an operation lever 53 mounted to the rear of the casing 2a. The one-way clutch 51 can be shifted between the two states by pivoting the operation lever 53. In the operative state, reverse rotation of the rotor 3 is not possible, whereas in the non-operative state, reverse rotation of the rotor 3 is possible.

Configuration of the Spool

The spool 4 is arranged between the first rotor arm 31 and the second rotor arm 32 of the rotor 3, and is fastened to the front end of the spool shaft 15 with a drag mechanism 60 interposed between the spool shaft 15 and the spool 4. The spool 4 includes a bobbin trunk portion 4a, made for example of an aluminum alloy, for winding fishing line around its circumference, a skirt portion 4b formed in one piece with the rear of the bobbin trunk portion 4a, and a front flange portion 4c attached to the front of the bobbin trunk portion 4a. The bobbin trunk portion 4a is a cylindrical member extending to the outer peripheral side of the cylindrical portion 30 of the rotor 3.

Configuration of the Rotor Driving Mechanism

As shown in FIG. 2, the rotor driving mechanism 5 includes a main gear shaft 10, a main gear 11 and a pinion gear 12. The main gear 11 rotates together with the main gear shaft 10, on which the handle 1 is mounted non-rotatably. The pinion gear 12 meshes with the main gear 11. The pinion gear 12, which is tubular and rotates when the handle is turned, is pierced by the horizontally extending spool shaft 15. The pinion gear 12, which is a hollow tubular member made of metal, is pierced by the spool shaft 15. The middle and the rear of the pinion gear 12 are supported rotatably with bearings 14a and 14b by the casing 2a. The rotor 3 is mounted non-rotatably to the front end 12a of the pinion gear 12. The bearing 14a on the front side is a ball bearing mounted to the inside of the rotation support portion 27. The bearing 14b on the rear side is a brimmed bushing.

Configuration of the Oscillation Mechanism

The oscillation mechanism 6 shifts the spool 3 back and forth via the spool shaft 15 when the handle 1 is turned. The rotation of the handle 1 is transmitted to the oscillation mechanism 6 via a power transmission mechanism. As shown in FIG. 2, the oscillation mechanism 6 includes a threaded shaft 21, a slider 22 and a driven gear 23. The threaded shaft 21 is arranged parallel to the spool shaft 15. The slider 22 moves back and forth along the threaded shaft 21 in accordance with the rotation of the threaded shaft 21. The driven gear 23 is mounted to the front end of the threaded shaft 21. The rotation of the pinion gear 12 is geared down and transmitted to the driven gear 23 by the power transmission mechanism. The spool shaft 15 is coupled non-rotatably to the slider 22, so that the slider 22 shifts back and forth and the spool 4 is also reciprocated back and forth in coordination with the rotation of the handle 1.

Function and Operation of the Reel

When casting this spinning reel, the bail arm 44 is toppled from the line-winding posture to the line-releasing posture. Then, the fishing rod is swung and the tackle is cast out. Thus, fishing line is released in a helical fashion from the front end of the spool 4.

When taking up fishing line., the bail arm 44 is toppled into the line-winding posture. This happens automatically due to the bail tripping mechanism 48 when the handle 1 is rotated in the line-winding direction. When the handle 1 is rotated in the line-winding direction, the rotational force is transmitted via the main gear shaft 10 and the main gear 11 to the pinion gear 12. The rotational force transmitted to the pinion gear 12 is transmitted to the rotor 3 via the front portion 12a of the pinion gear 12, and the rotor 3 is rotated in the line-winding direction.

On the other hand, the threaded shaft 21 is rotated by the driven gear 23, which meshes over the power transmission mechanism with the pinion gear 12. Then, the slider 22 meshing with the threaded shaft 21 is shifted back and forth by the rotation of the threaded shaft 21. Then, the fishing line that is guided by the bail arm 44 to the spool 4 is wound around the bobbin trunk portion 4a of the spool 4, so that the fishing line is wound around the spool 4. Since the through holes 65a, 65b and 65c have been provided as mass adjustment portions in the second cover member 47, the rotational balance tends not to fluctuate when rotating the rotor 3, even when the degree of exposure of the aperture is changed.

Other Embodiments (a) In the above-described embodiment, the mass has been adjusted with the through holes 65a, 65b and 65c. It is, however, also possible to configure mass adjustment portions by providing depressions or chamfers or otherwise changing the shape of the second cover member 47.

(b) In the above-described embodiments, a front drag type spinning reel was given as an example, but the present invention can also be applied to the rotors of rear drag or lever brake spinning reels.

(c) In the above-described embodiments the second rotor arm was provided with an aperture, but it is also possible to provide the first rotor arm with an aperture. In that case, the bail tripping mechanism may be provided at the second rotor arm.

In accordance with the present invention, when cover members with different degrees of exposure of an aperture are mounted to the outside of a rotor arm having an aperture, then the mass of the cover member can be adjusted to a predetermined range with a mass adjustment portion. For example, a cover member can have the mass adjustment portion that closes the aperture completely or partially, or that exposes the aperture completely. Accordingly, the mass of the cover member can be adjusted by the mass adjustment portion so as to be within a predetermined range. Thus, it is possible to suppress variations of the rotational balance of cover members with different degree of exposure of the aperture.

As used herein, the following directional terms "forward," "rearward," "above." "downward," "vertical," "horizontal," "below," and "transverse" as well as any other similar directional terms refer to those directions of a device equipped with the present invention. Accordingly, these terms, as utilized to describe the present invention should be interpreted relative to a device equipped with the present invention.

The terms of degree such as "substantially" "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-026847. The entire disclosure of Japanese Patent Application No. 2002-026847 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of manufacturing a spinning reel rotor, comprising steps of:

providing a cylindrical portion, first and second rotor arms that are connected to the cylindrical portion, and a bail;

attaching the bail to front ends of the first and second rotor arms;

providing a first cover and attaching the first cover to the front end the first rotor arm, where the bail is attached;

providing a plurality of second covers each having a mass adjustment portion formed thereon such that a difference in weight between any two of the plurality of second covers is less than 1 g, the mass adjustment portion of each of the plurality of second covers differing in shape;

attaching one of the plurality of second covers to the front end of the second rotor arm, where the bail is attached, the plurality of second covers being formed such that the second cover that is attached to the front end of the second rotor arm is replaceable with any other one of the plurality of second covers.

2. The method of manufacturing a spinning reel rotor as set forth in claim 1, wherein the mass adjustment portion of the second cover attached to the second rotor arm includes at least one perforating through hole.

3. The method of manufacturing a spinning reel rotor as set forth in claim 2, wherein the mass adjustment portion of the second cover attached to the second rotor arm also has a chamfer portion formed around the through hole.

4. The method of manufacturing a spinning reel rotor as set forth in claim 1, wherein the mass adjustment portion of the second cover attached to the second rotor arm includes at least one depression.

5. The method of manufacturing a spinning reel rotor as set forth in claim 4, wherein the mass adjustment portion of the second cover attached to the second rotor arm also has a chamfer portion formed around the depression.

6. The method of manufacturing a spinning reel rotor as set forth in claim 2, wherein the mass adjustment portion of the second cover attached to the second rotor arm includes at least three perforating through holes.

7. The method of manufacturing a spinning reel rotor as set forth in claim 6, wherein the mass adjustment portion of the second cover attached to the second rotor arm also has a chamfer portion formed around the through holes.

8. The method of manufacturing a spinning reel rotor as set forth in claim 1, wherein said second rotor arm has an aperture formed thereon, and the mass adjustment portion of the second cover attached to the second rotor arm includes at least one through hole perforating the second cover, the through hole exposing a portion of the aperture.

9. The method of manufacturing a spinning reel rotor as set forth in claim 1, wherein the difference in weight between any two of the plurality of second covers is less than 0.5 g.

* * * * *